Figure 1:
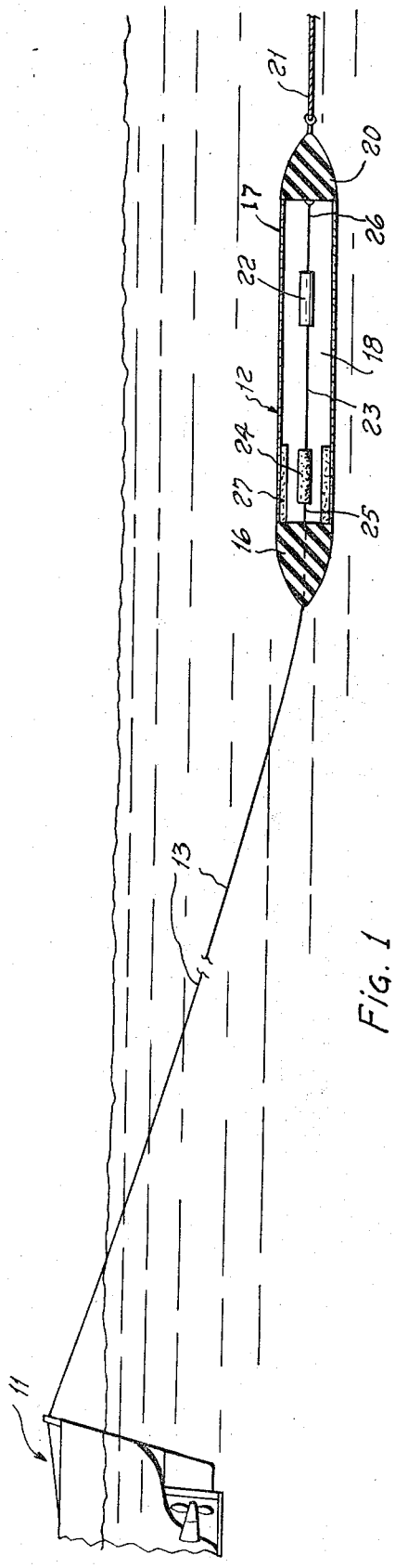

United States Patent [19]

Watlington

[11] 3,860,899

[45] Jan. 14, 1975

[54] STRUM NOISE REDUCING DEVICE

[75] Inventor: Francis W. Watlington, Coralita Pembroke, Bermuda

[73] Assignee: The United States of America as represented by the Secretary of the Navy, Washington, D.C.

[22] Filed: Oct. 8, 1968

[21] Appl. No.: 766,382

[52] U.S. Cl. .................................. 340/3 T, 340/7 R
[51] Int. Cl. .............................................. G01s 7/66
[58] Field of Search .......... 340/3 T, 8, 7, 17, 5, 3 T, 340/7 R, 8 R, 5 R, 17

[56] References Cited
UNITED STATES PATENTS

| | | | |
|---|---|---|---|
| 3,281,772 | 10/1966 | Abbott | 340/8 X |
| 3,283,293 | 11/1966 | Pavey, Jr. et al. | 340/7 |
| 3,371,311 | 2/1968 | Cholet et al. | 340/17 |

*Primary Examiner*—Richard A. Farley
*Attorney, Agent, or Firm*—R. S. Sciascia; C. E. Vautrain, Jr.

[57] ABSTRACT

A device for reducing noise in a towed hydrophone system caused by cable strum is provided by producing a signal that is proportional to the strum signal but is uninfluenced by the acoustic signal. A geophone, an accelerometer or a strain gauge may be suitably positioned to be sensitive only to the distortion caused by cable strum. The strum signal thus detected is introduced in opposition to the combined acoustic and strum signal received by the hydrophone so that strum noise in the acoustic signal is erased or substantially deleted.

6 Claims, 2 Drawing Figures

PATENTED JAN 14 1975 3,860,899

INVENTOR.
FRANCIS W. WATLINGTON

C. E. Vautrain Jr., Agent

STRUM NOISE REDUCING DEVICE

The invention described herein may be manufactured and used by or for the Government of the United States of America for governmental purposes without the payment of any royalties thereon or therefor.

This invention relates to improving the quality of acoustic signals and more particularly to the substantial reduction of strum noise in acoustic signals received by a towed hydrophone system.

In oceanographic work, hydrophones are towed behind ships primarily to remove the hydrophone from the vicinity of the ship since the ship is a source of considerable noise. These towed hydrophones must be connected to the ship by cables and such cables, when dragged through the water, develop a transverse vibratory motion called Aeolian strum. This strum is a source of serious interference with the acoustic signals of the hydrophone and therefore much effort has been directed toward its elimination.

The transverse vibrations caused by Aeolian strum result in axial vibrations in the free end of the cable since the other end of the towing cable is secured to the ship. These transverse vibrations arising along the cable length result in the forward and backward axial motion at the free end of the cable which motion is transferred to the pressure transducer of the hydrophone through the elasticity of its flexible container and the inertia of the filling fluid in the container surrounding the hydrophone.

A number of devices have been made for eliminating the noise due to cable strum, the most effective being the use of an elastic isolator which is imbued with mechanical, resistive, inductive and capacitive characteristics or a combination thereof for the reduction of the Aeolian type interference. Other prior efforts to reduce the strum noise involve automatically mechanically coupling a signal recorder playback device to the sound-producing source and then using the machine itself to drive the recorder playback device. A further strum noise reduction device requires the use of a towable, hollow ellipsoidal enclosure in which the hydrophone is disposed. Such an enclosure may be flooded with water from the environment in which the hydrophone is immersed. This system generally requires a hydrophone having a perforate nose portion, a perforate sleeve, a center portion and a faired tail to which a streamer may be attached. A further means for reducing cable strum noise requires the isolation of the hydrophone from the towing cable by attaching a weight at the free end of the cable and then disposing the hydrophone laterally from the weight. Each of the foregoing devices, among other disadvantages, requires a considerable amount of additional equipment which adds to the bulk of the towed array, increases the costs of the array and complicates its assembly.

The present invention avoids the disadvantages of prior devices by reducing strum noise through the addition of a very small velocity-sensitive device electrically connected to the hydrophone. The velocity-sensitive device is sensitive to small changes in velocity and, in this respect, may be one of several instruments which are available in the art. While the following description relates to the use of a geophone as the velocity-sensitive device, it will be appreciated that an accelerometer isolated from the acoustic signal or a strain gauge suitably positioned to be sensitive to the distortion caused by cable strum, among other devices, may be utilized.

Accordingly, it is an object of the present invention to provide a strum noise reducing device which is compact and has no appreciable effect on the hydrodynamic characteristics of a hydrophone system.

Another object of the invention is to provide a strum noise reducing device which operates through generating a signal proportional to the strum signal, such proportional signal then being introduced in opposition to the acoustic signal to reduce or substantially eliminate strum noise.

A further object of the invention is to provide a strum noise reducing device in a towed hydrophone system in which a signal is produced in proportion to the strum signal but is in no way influenced by the acoustic signal.

Figure 2:
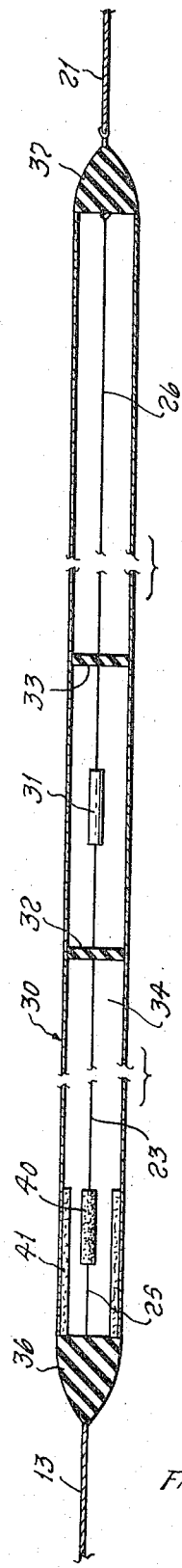

Other objects, advantages and novel features of the invention will become apparent from the following detailed description thereof when considered in conjunction with the accompanying drawing in which like numerals represent like parts throughout and wherein:

FIG. 1 is a schematic view of a hydrophone system being towed in a water environment and including one embodiment of the strum noise reduction device of the present invention; and FIG. 2 is an enlarged view of another hydrophone system in which the embodiment of the strum noise reduction device of FIG. 1 is included.

Referring to FIG. 1, a ship 11 is shown connected to a hydrophone housing 12 by a towing cable 13. Hydrophone housing 12 includes a nose section 16 preferably made of nonrigid material, a sleeve 17 preferably made of compliant material and which encloses a hydrophone cavity 18 and a tail section 20 to which a streamer of rope 21 may be attached. Disposed within cavity 18 is a hydrophone 22 which is electrically connected by means of an axially extending compliant conductor 23 to a velocity-sensitive device such as geophone 24 which, in turn, is electrically connected to ship 11 by a complaint conductor 25. Hydrophone 22 is anchored to tail section 20 preferably by a nonconductor 26. Disposed about the interior surface of sleeve 17 opposite geophone 24 is a shield 27 of acoustic absorbing material for blocking echo signals from the geophone.

Conductors 23 and 25 and nonconductor 26 preferably are made of compliant material to sustain the longitudinal extension and contraction of hydrophone housing 12 and to assure that hydrophone 22 and geophone 24 undergo the same axial movement. Nose section 16 and tail section 20 also are of compliant material with the nose section streamlined to decrease water resistance and create the least additional disturbance. Cavity 18 in hydrophone housing 12 preferably is filled with oil. Conductor 25 traverses nose section 16 and is connected through conductors in cable 13 to receiving and/or transmitting apparatus, not shown, onboard ship 11. In the hydrophone housing 12 of FIG. 1, electrical conductor 23 is selectively tensioned to preclude hydrophone 22 and geophone 24 from coming into contact with the walls of the cavity during predictable bending of the outer structural members of the hydrophone assembly.

In FIG. 2, the intermediate section 30 is made longer to more effectively damp extraneous signals, and because of this length, hydrophone 31 preferably is spaced from the walls of the cylinder 30 by spacers 32 and 33. These spacers are axially positioned in cavity 34 sufficiently close to the hydrophone to preclude the hydrophone from contacting the surface during predictable bending of the hydrophone assembly. Nose section 36 and tail section 37 are similar in construction and function to their related components in the embodiment of FIG. 1 as are geophone 40 and acoustic signal absorbing shield 41. Both geophones 24 and 40 are secured to the nose sections of their respective hydrophone housings by conductor 25 to more accurately detect axial movement occasioned by the Aeolian strum set up in cable 11. It will be understood, however, that conductor 25 may be made of noncompliant material within the concept of the invention and that, if so made, this connecting member would transmit cable end motion undamped by induced hydrophone housing vibration.

Geophones 24 and 40 are fixed mechanically to the point where cable 13 enters the respective hydrophone housing and the axis of each geophone coil is so oriented as to be parallel to its respective hydrophone axis. Anchored geophone magnets, not shown, and the respective geophone housings move in a manner that is proportional to the axial movement of the end of the cable due to Aeolian strum. The inertia of the geophone coils tending to stand still causes the winding of the coils to move in the magnetic field producing a signal that is proportional to the cable strum. The signal from the coils and the signal from the hydrophones due to cable strum are then combined in a manner well known in the art so as to cancel one another, leaving that component of the output from the hydrophones caused by the acoustic signal to be unaffected.

It will be appreciated that the present invention eliminates interfering signals due to cable strum without the need of such ancillary devices as elastic isolators, dual plane hydrophones and mechanically coupled background noise reducers. With such ancillary devices no longer required, the hydrophone housing may be used in its original external form. Thus, the bulk and shape of the towed device is not affected by the addition of the strum eliminating, velocity-sensitive components.

It will be recognized that many modifications and variations of the present invention are possible in the light of the above teachings. For example, although the device has been conceived and embodied in a towed hydrophone, it also could be used in fixed installations where a stream of water due to tides or to the flow of a river cause the type of unwanted signal which has been eliminated.

What is claimed is:

1. A noise reducing device for substantially reducing or eliminating strum noise occasioned by towing by ship of underwater objects comprising:
   a tow cable secured at one end to a towing ship;
   a hydrophone housing secured at the other end of said tow cable,
      said housing having a centrally disposed cavity and a viscous fluid in said cavity;
   a hydrophone positioned axially in said cavity by a forwardly extending conductive connector and a rearwardly extending nonconductive connector,
      said conductive connector extending to said ship through the forward end of said housing,
      said nonconductive connector connected to the aft end of said housing;
   cable strum sensing and transducing means in said cavity connected to said hydrophone and said housing for producing an electric signal proportional to the strum of said cable; and
   means for introducing said electric signal in opposition to the electric signals generated in said hydrophone so that strum noise signals in the signal output of said hydrophone are substantially eliminated.

2. The device as defined in claim 1 wherein said sensing means is connected in series between said hydrophone and said ship; and
   means in said cavity isolating said sensing means from the acoustic signals which are received by said hydrophone.

3. The device as defined in claim 2 wherein said sensing means is positioned in the forward end of said cavity,
   said hydrophone housing including a nose section and a tail section spaced apart by an intermediate sleeve member all of compliant material,
      said sleeve member and said nose and tail sections forming said cavity,
   said sheath disposed adjacent the interior surface of said sleeve and extending rearward from the aft end of said nose section so as to encircle said sensing means.

4. The device as defined in claim 3 wherein said sensing means is a geophone.

5. The device as defined in claim 3 wherein said sensing means is an accelerometer.

6. The device as defined in claim 3 wherein said sensing means is a strain gauge positioned so as to be sensitive to the distortion caused by cable strum.

* * * * *